(12) United States Patent
Gussner et al.

(10) Patent No.: US 11,798,291 B2
(45) Date of Patent: Oct. 24, 2023

(54) REDUNDANCY INFORMATION FOR OBJECT INTERFACE FOR HIGHLY AND FULLY AUTOMATED DRIVING

(71) Applicant: Robert Bosch GmbH, Stuttgart (DE)

(72) Inventors: Thomas Benjamin Gussner, Ludwigsburg (DE); Theresa Veronika Kienle, Stuttgart (DE); Joachim Carsten Mueller, Boeblingen (DE); Stephan Reuter, Elchingen (DE); Oliver F. Schwindt, Sunnyvale, CA (US); Andreas Heyl, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 411 days.

(21) Appl. No.: 15/931,160

(22) Filed: May 13, 2020

(65) Prior Publication Data

US 2020/0377121 A1    Dec. 3, 2020

Related U.S. Application Data

(60) Provisional application No. 62/854,729, filed on May 30, 2019.

(51) Int. Cl.
*G06V 20/58* (2022.01)
*B60W 60/00* (2020.01)
(Continued)

(52) U.S. Cl.
CPC .......... *G06V 20/584* (2022.01); *B60W 10/18* (2013.01); *B60W 10/20* (2013.01); *B60W 50/14* (2013.01);
(Continued)

(58) Field of Classification Search
CPC ... G06V 20/584; G06V 10/764; B60W 10/18; B60W 10/20; B60W 50/14;
(Continued)

(56) References Cited

U.S. PATENT DOCUMENTS 8,799,201 B2    8/2014  James et al.
9,193,303 B2   11/2015  Higgins-Luthman
(Continued)

OTHER PUBLICATIONS

M. Aeberhard, S. Paul, N. Kaempchen and T. Bertram, "Object existence probability fusion using dempster-shafer theory in a high-level sensor data fusion architecture," 2011 IEEE Intelligent Vehicles Symposium (IV), 2011, pp. 770-775, doi: 10.1109/IVS.2011.5940430. (Year: 2011).*

(Continued)

*Primary Examiner* — James J Lee
*Assistant Examiner* — Wenyuan Yang
(74) *Attorney, Agent, or Firm* — Michael Best & Friedrich LLP

(57) ABSTRACT

A system for a reliability of objects for a driver assistance or automated driving of a vehicle includes a plurality of sensors that include one or more sensor modalities for providing sensor data for the objects. An electronic tracking unit is configured to receive the sensor data to determine a detection probability (p_D) for each of the plurality of sensors for each of the objects, to determine an existence probability (p_ex) for each of the plurality of sensors for each of the objects, and to provide vectors for each of the objects based on the existence probability (p_ex) for each contributing one of the plurality of sensors for the specific object. The vectors are provided by the electronic tracking unit for display as an object interface on a display device. The vectors are independent from the sensor data from the plurality of sensors.

18 Claims, 2 Drawing Sheets

(51) Int. Cl.
*B60W 50/14* (2020.01)
*B60W 10/18* (2012.01)
*B60W 10/20* (2006.01)
*G06V 10/764* (2022.01)

(52) U.S. Cl.
CPC ....... *B60W 60/0025* (2020.02); *G06V 10/764* (2022.01); *B60W 2420/42* (2013.01); *B60W 2420/52* (2013.01); *B60W 2555/60* (2020.02)

(58) Field of Classification Search
CPC ......... B60W 60/0025; B60W 2555/60; B60W 2420/42; B60W 2420/52
See application file for complete search history.

(56) References Cited

U.S. PATENT DOCUMENTS

| | | | |
|---|---|---|---|
| 9,239,380 B2 | 1/2016 | Hegemann et al. | |
| 2009/0204289 A1* | 8/2009 | Lehre | G01S 13/931 |
| | | | 701/36 |
| 2017/0080929 A1 | 3/2017 | Sawamoto | |
| 2017/0329332 A1 | 11/2017 | Pilarski et al. | |
| 2018/0148047 A1 | 5/2018 | Kadetotad et al. | |
| 2019/0369624 A1* | 12/2019 | Otsuka | G05D 1/0214 |
| 2021/0162995 A1* | 6/2021 | Shalev-Shwartz | G01S 13/931 |

OTHER PUBLICATIONS

M. Munz, M. Mählisch, J. Dickmann and K. Dietmayer, "Probabilistic modeling of sensor properties in generic fusion systems for modern driver assistance systems," 2010 IEEE Intelligent Vehicles Symposium, 2010, pp. 760-765, doi: 10.1109/IVS.2010.5548040 (Year: 2010).*

* cited by examiner

REDUNDANCY INFORMATION FOR OBJECT INTERFACE FOR HIGHLY AND FULLY AUTOMATED DRIVING

CROSS-REFERENCE TO RELATED APPLICATIONS

This application claims priority to provisional application U.S. 62/854,729 filed May 30, 2019, the disclosure of which is hereby incorporated by reference in its entirety.

BACKGROUND

In driver assistance and in automated driving, a representation of the vehicle environment inter alia in the form of an object list is usually chosen. The objects describe other road users, inter alia. On the basis of the object properties, a function decides whether and how a reaction thereto ought to appear. One example in this respect is present-day emergency braking systems (AEB systems), which recognize whether a collision with another road user is imminent and, if so, intervene accordingly. Since the environment perception may be erroneous, quality measures are calculated for the object and used by the function to decide whether the object is reliable enough thereupon to trigger e.g. emergency braking. One typical measure used in present-day driver assistance systems (DA systems) or arrangements is the object existence probability. Since false positive interventions must be avoided in AEB systems, the function generally reacts only to objects having a sufficiently high existence probability and ignores all other objects. In AEB systems that operate with a plurality of sensors, a confirmation flag is moreover frequently used. Only if both sensors confirm the object, is the emergency braking triggered.

This tried and tested path for DA systems is no longer possible for automated driving since both false positive and false negative reactions must be avoided. The trade-off between false positive (FP) and false negative (FN) cannot be fixedly chosen, but rather depends on the intervention severity.

Since a self-driving car has a redundant sensor set, for each object it is possible to keep a record of which sensors (e.g. radar sensors, video imaging sensors, Lidar sensors) have confirmed said object. Depending on a suitable manifestation of the trade-off between FPs and FNs, only objects seen by one sensor or by a plurality of sensors are taken into consideration.

A further motivation in respect thereof is that for system reactions assessed as per Automotive Safety Integrity Level D (ASIL D) (e.g. emergency braking from high speed with high speed reduction) defined by ISO 26262 from the International Standards Institute. For instance, the information of a single ASIL B sensor is not sufficiently reliable, including from the standpoint of electrical hardware errors.

A weakness of the approach described is the temporal aspect. In this regard, it may happen that an object is measured only sporadically by one of the sensors, or that the measurements associated with the object match only inexactly (e.g. deviating object type classification, deviating Doppler speed in the case of radar sensors). In the case of dynamic scenarios, in particular, what is of interest is not only the existence of an object (that is to say whether the object is a phantom object or a real object), but also how consistently different sensors have measured the object properties (in particular speed).

SUMMARY

The embodiments herein describe a method and system for representing the reliability of an object, having the following properties:

1. How consistently and reliably the dynamic state of an object is estimated from the sensor signals present.
2. Uses a probabilistic representation: flags are not set, rather continuous values are calculated, to which different threshold values can be fixed depending on the criticality of the system reaction.
3. Provide various sensor configurations, as a varying number of diverse sensor technologies are contemplated.
4. Encapsulate the sensor-specific knowledge so that a planning unit can assess the redundancy/reliability of an object independently of knowledge about sensors and sensor principles used.
5. Provide an object interface for customers who want to develop a standalone electronic planning unit.

For this purpose, sensor-type-specific existence probabilities are calculated and subsequently converted into a sensor-independent vector of existence probabilities taking account of the detection probabilities of the sensors for each object.

Furthermore, when assessing the redundancy of an object, it is necessary to take account of which sensors/measurement principles were actually able to measure an object (not only visibility range, but also environmental conditions, sensor blindness, degradation, dynamic concealment, etc.).

In one embodiment, a system for driver assistance or automated driving of a vehicle by detecting a reliability of objects that are detected includes a plurality of sensors for providing sensor data for the objects, the plurality of sensors including different sensor modalities. The system includes an electronic tracking unit for receiving the sensor data. The electronic tracking unit is configured to process the sensor data to: determine a detection probability ($p\_D$) for each of the plurality of sensors for the objects, and determine an existence probability ($p\_ex$) for each of the plurality of sensors for the objects. The electronic tracking unit is also configured to provide vectors for each of the objects based on the existence probability ($p\_ex$) for each of the plurality of sensors for each of the objects, wherein the vectors include all existence probabilities of all contributing ones of the plurality of sensors for each of the objects. The vectors are a sensor independent representation.

In another embodiment, a system is provided for determining reliability of an object detected for a driver assistance arrangement or autonomous vehicle. The system includes a plurality of sensors for providing sensor data for objects, the plurality of sensors including different sensor modalities, and an electronic tracking unit for receiving the sensor data. The electronic tracking unit is configured to process the sensor data to: determine a detection probability ($p\_D$) for each of the plurality of sensors for each of the objects, determine an existence probability ($p\_ex$) for each of the plurality of sensors for each of the objects, and provide vectors for each of the objects based on the existence probability ($p\_ex$) for all contributing ones of the plurality of sensors for each of the objects. A display device displays the vectors as an object interface.

Other aspects, features, and embodiments will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable media) executable by one or more electronic controllers. For example, "units," "control units," and "controllers" described in the specification can include one or more electronic controllers, one or more memories including non-transitory computer-readable media, one or more input/output interfaces, one or more application specific integrated circuits (ASICs) and other circuits, and various connections (for example, wires, printed traces, and buses) connecting the various components.

Figure 1:
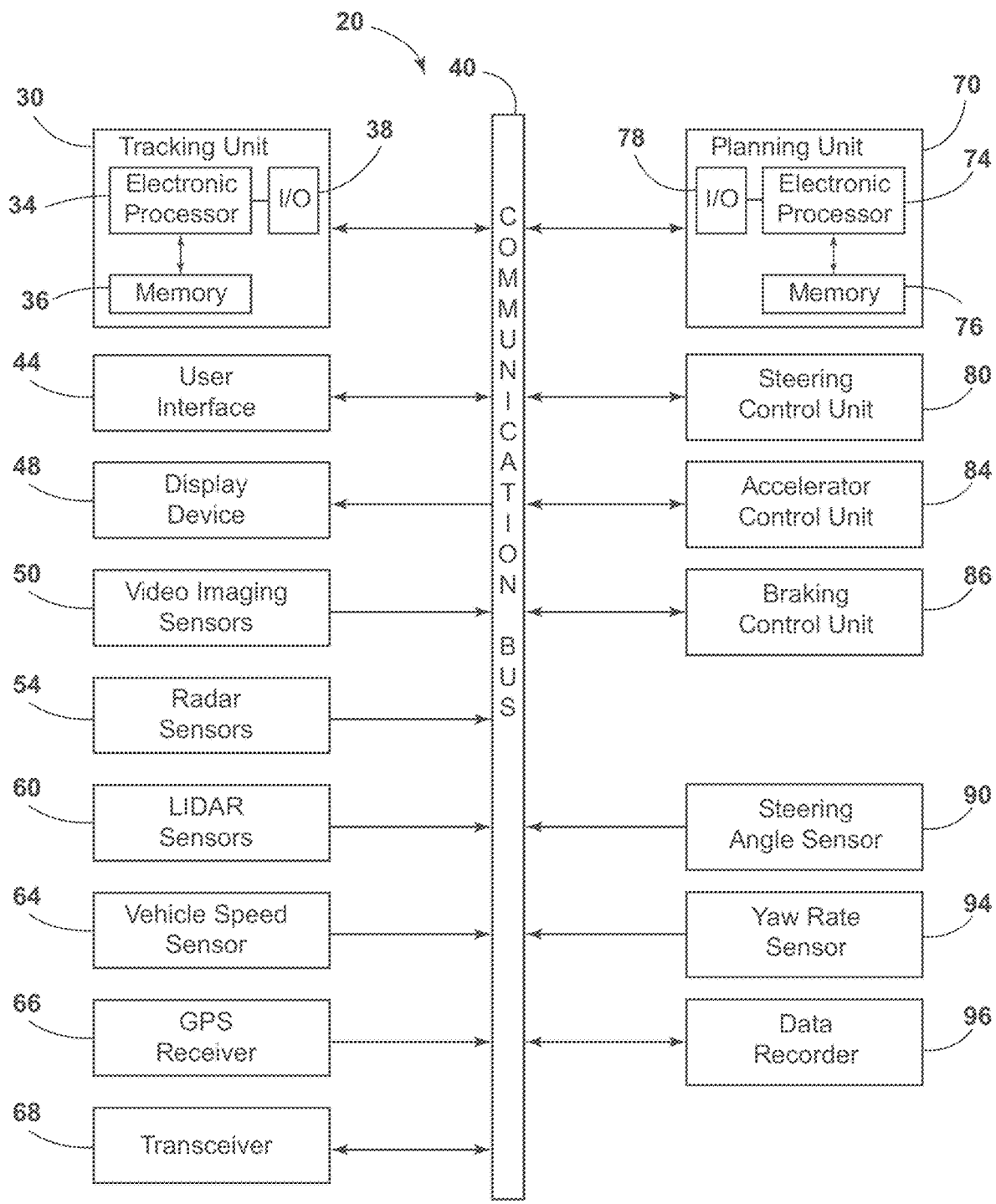
FIG. 1 illustrates a block diagram of a vehicle equipped with a vehicle system according to one embodiment.

FIG. 1 shows a block diagram of a vehicle system 20 for tracking objects and for determining reliability of an object presence near a vehicle. The vehicle system 20 includes an electronic tracking unit 30. The electronic tracking unit 30 includes an electronic processor 34, a memory 36, and an input/output (I/O) interface 38 connected to a communication bus 40. The memory 36 includes at least one or both of random access memory (RAM) and read only memory (ROM). The electronic processor 34 of the electronic tracking unit 30 is configured to execute programs for tracking objects as set forth below.

The communication bus 40 shown in FIG. 1 is a flex-ray bus, CAN bus or other type of communication link between a plurality of control units, sensors, and other devices. A user interface 44 shown in FIG. 1 enables a user to provide inputs to various devices in the vehicle system 20. A display device 48 provides visual display of information to a user. In one embodiment, the display device 48 and user interface 44 are combined in a touchscreen. In another embodiment, the user interface 44 includes a keyboard to receive inputs. In one embodiment, a display device 48 for displaying an object interface is contemplated. In another embodiment, the user interface 44 includes a microphone and speech analyzer to receive speech commands or inputs.

FIG. 1 shows a plurality of video imaging sensors 50, such as video cameras, for providing video images of objects about a vehicle. A plurality of radar sensors 54 are provided for providing radar sensing of objects about the vehicle. Further, Doppler sensing is provided to determine relative speed of objects that are detected. A plurality of light detection and ranging (Lidar) sensors 60 are also provided for detecting objects and distances thereof about a vehicle. In one embodiment, the Lidar sensors 60 are mounted in a Lidar sensing unit above a roof of a vehicle and the Lidar sensors are rotatable for scanning about the vehicle.

The vehicle system 20 in FIG. 1 includes a vehicle speed sensor 64 for providing vehicle speed to the various units. A global positioning signal (GPS) receiver 66 is provided to receive GPS signals to determine a location of the vehicle and for mapping and for other purposes. A transceiver 68 is provided for remote two-way wireless communication with other remote devices.

The vehicle system 20 of FIG. 1 includes an electronic planning unit 70 for providing driving assistance in one embodiment, and autonomous control of a vehicle in another embodiment. The electronic planning unit 70 includes an electronic processor 74, a memory 76, and an input/output (I/O) interface 78 connected to the communication bus 40. The memory 76 includes at least one or both of random access memory (RAM) and read only memory (ROM). The electronic processor 74 is configured to execute programs for planning control of an autonomous vehicle or planning driver assistance of a driver controlled vehicle.

The vehicle system 20 of FIG. 1 includes a steering control unit 80 for controlling a steering direction of the vehicle and an accelerator control unit 84 for controlling acceleration of the vehicle. The vehicle system 20 includes a braking control unit 86 for selectively controlling braking of the vehicle. The vehicle system 20 further includes a steering angle sensor 90 for determining a steering angle position for the vehicle and a yaw rate sensor 94 for determining a yaw rate of the vehicle. In one embodiment, the vehicle system 20 includes a data event recorder 96 for recording vehicle data for future use. In an autonomous vehicle control embodiment, the GPS receiver 66 receives signals to map the location of the vehicle and the electronic processor 74 of the electronic planning unit 70 determines from vehicle mapping, the vectors from the electronic tracking unit 30 and other data, where to control the steering control unit 80 and how to control the accelerator control unit 84 and/or the braking control unit 86 to guide the vehicle to a predetermined, stored destination.

Operation

A method involves the electronic processor 34 of the electronic tracking unit 30 for calculating a separate object existence probability p_ex for each sensor modality from the following: a) detection probability p_D for an object; b) probability of incorrect measurement; c) measurement likelihood, that is to say how well an associated measurement matches an object estimation; and d) the existence probability of the object in the previous cycle. The calculation of the claimed reliability representation is carried out in each cycle by the electronic processor 34, independently of what type of sensor is used to carry out measurements to update the objects. The existence probability value p_ex is between 0 and 1, wherein the value of 0 means the object is not detected. In another embodiment p_D is computed in sensor preprocessing, rather than by the electronic tracking unit 30.

In the method, the separate existence probability is calculated by the electronic tracking unit 30 for one or more sensor modalities. For example, in the case of a sensor set containing radar sensors 54, Lidar sensors 60, and video imaging sensors 50, existence probability p_ex,R (for radar), existence probability p_ex,L (for Lidar) and existence probability p_ex,V (for video) are calculated. This is an advantageous embodiment for dynamic objects representing other road users since the objects can be identified with all sensor modalities. In other embodiments, some sensor modalities do not identify the objects.

The method can be applied to relevant objects/object properties which can be identified only with a specific sensor modality, but in return are identified by a plurality of instances of this sensor. One example is the identification of traffic lights. The traffic lights status (red, amber, green, . . . ) can be measured only by video imaging sensors 50. In some embodiments, the transceiver 68 is a Car2X transceiver to receive traffic light status. If a plurality of cameras are used to determine the color of the traffic lights, it is advantageous to calculate separate existence probabilities for each of the cameras, that is to say e.g. p_ex,V1 (first camera), p_ex,V2 (second camera), p_ex,V3, etc. There is no restriction here to three values. In other words, in a generalized manner, a vector of existence probabilities is calculated with N values p_ex,i. These N values here mirror what type of redundancy is intended to be modeled (that is to say redundancy of an object measurement by way of different sensor modalities, redundancy of the traffic lights status measurement by different video imaging sensors 50).

The respective existence probability p_ex,i is updated only with measurements of the respective sensor type, e.g. p_ex,R is only updated if a radar measurement is integrated.

In addition to the vector having existence probabilities, a vector of identical size having detection probabilities p_D,i is determined by the electronic tracking unit 30. This vector represents the sensor modality (or the video imaging sensor 50 in the case of the identification of traffic lights) for which an object is visible. The detection probability is made available as information from the sensor on the basis of the sensor data and, under certain circumstances, the present environment model and, under certain circumstances, using map data in each measurement cycle for each object. In this case, e.g. concealment, sensor visibility range, object class, object properties, or the like are taken into account, but also sensor failures, sensor blindness, etc. Furthermore, it is also possible to take account of specific electrical hardware errors on the signal path in the calculation of p_D. For example, when the de-mosaicing in a video imaging sensor 50, such as a camera is defective, p_D for the camera is reduced. The measurements then need not necessarily be discarded). The higher the probability that a sensor can measure an object, the closer the respective value of p_D is to 1. Each entry of the vector having detection probabilities generally represents a plurality of sensor instances, such as all Lidar sensors 60. Therefore, the maximum of all detection probabilities p_D which belong to an entry of the vector is formed in each processing step by the electronic tracking unit 30. If no measurement and thus no p_D,i of a sensor modality are received in a processing step, then the corresponding entry from the previous cycle is used and reduced by a value dependent on the time difference with respect to the last measurement value. By way of example, the value p_D,i for the cycle k can then be calculated by the electronic tracking unit 30 as follows:

$$p\_D,i(k)=p\_D,i(k-1)-\Delta T * \text{constant}.$$

In this way, each object contains information about with which measurement principle the object can currently be seen and how consistently the respective sensor measurements match the object estimation.

No Video Sensor Functioning Example

In one operation, the electronic processor 34 of the electronic tracking unit 30 receives sensor data from the sensors 50, 54, 60 and determines that a vehicle object contains or corresponds to the following values:
p_D,Radar=0.9, p_D,Video=0.1, p_D,Lidar=0.8
p_ex,Radar=0.1, p_ex,Video=0, p_ex,Lidar=0.99

At the moment, the object can actually be measured only by the radar sensors 54 and the Lidar sensors 60 (e.g. because the video imaging sensors 50 are soiled). However, the radar sensors 54 measure the object only very unreliably (p_ex,Radar is very low), while the Lidar sensors 60 measure the object very reliably. Accordingly, the above values rely mainly on the Lidar sensors 60 in the calculations by the electronic tracking unit 30.

Four Video Imaging Sensors Example

A vehicle has installed four video imaging sensors 50, such as cameras, for identifying the state of traffic lights. A traffic light object is determined to have the following values for cameras 1-4 by the electronic tracking unit 30:
p_D,1=0.1, p_D,2=0.3, p_D,3=0.9, p_D,4=0.9
p_ex,1=0, p_ex,2=0.1, p_ex,3=0.8, p_ex,4=0.7

In this instance, of the four cameras only cameras #3 and #4 can reliably see the traffic light(s) (e.g. due to a smaller range/distance of use for the cameras #1 and #2). The electronic tracking unit 30 determines that the measurements from the third and fourth cameras match the traffic lights estimation very well and the measurement of the latter is consistent. A traffic light is identified initially from how many pixels would represent a traffic light, and the color of the light determined.

In a further calculation step of the method by the electronic tracking unit 30, the sensor-specific portion is abstracted in order to be able to determine a vector for a generic object interface for the electronic planning unit 70.

For this purpose, firstly the subset of all p_ex,i for which p_D,i exceeds a threshold value is formed by the electronic tracking unit 30. The sensor modalities which can actually measure the object at the present point in time are selected by the electronic tracking unit 30. In one embodiment, the threshold value p_D,th is chosen with 0.3. Afterwards, the remaining p_ex,i, maximum p_ex,max, minimum p_ex,min and median p_ex,med are calculated. These three values are made available as redundancy information for the vector and for the object interface. Thus, the electronic tracking unit 30 is configured to sense a presence of a traffic light, and a color thereof.

Radar/Video/Lidar Example

Another set of examples for multiple different sensor modalities is as follows. Three sensor modalities (radar, video, Lidar) measure an object consistently; the object is visible for all sensor modalities. In that case p_ex,max, p_ex,med, p_ex,min are all very close to 1. The object thus has full redundancy and ASIL D maneuvers, e.g. emergency braking, could be carried out for this object, if necessary. All three values being very high is the normal case in a non-degraded system for objects in the immediate vicinity of the SDC, e.g. for a vehicle ahead. Thus, the electronic tracking unit 30 is configured to provide a collection of existence probabilities defining vectors for each of the objects sensed based on the existence probability (p_ex) for each of the plurality of sensors for each of the objects.

Soiling of Sensor Example

Three sensor modalities measure an object, but the measurements of one of the sensors match the entire object estimation only poorly or the object is measured only sporadically (the reason may be, for instance, undetected soiling of the sensor). All sensor modalities have high p_Ds, that is to say that the sensors are able to measure the object. In that case, p_ex,max, p_ex,med are close to 1, but p_ex, min is low (e.g. at 0.4).

Two of Three Sensor Modalities Example

Only two of the three available sensor modalities are able to measure an object (e.g. because the visibility range of one of the sensor principles is less than that of the others and the object is correspondingly far away); both measure the object consistently and reliably. In that case, p_ex,max, p_ex,med, p_ex,min are all very close to 1. This is the same redundancy level as in example earlier, and shows that the approach is able to encapsulate knowledge about the sensor set-up used such as, for instance, individual visibility ranges of sensors at the interface to the electronic planning unit 70.

Phantom Object Example

Only one sensor measures and confirms an object consistently; all other sensors do not confirm the object even though it is in the visibility range and not occluded. In that case, p_ex,max is close to 1, but p_ex,med and p_ex,min are 0 (or close to 0). A phantom object is presumably involved here, in response to which, under certain circumstances, severe interventions should not be triggered. In order to minimize any risk, however, e.g. at an intersection, waiting at a safe standstill will nevertheless continue until this object having a low redundancy level has driven through. Such an object will also be taken into account when planning e.g. evasive trajectories around other objects.

In an alternative embodiment, the approach can be generalized by a vector of variable length being output instead of minimum, maximum and median of the existence probabilities. The vector can contain e.g. all existence probabilities of all contributing sensor modalities. For three contributing sensor modalities (e.g. video, radar, Lidar), the vector is then identical to the described method using an existence probability maximum (p_ex, max), an existence probability minimum (p_ex, min), and an existence probability median (p_ex, med) for each of the objects minimum, maximum and median values for the sensor modalities.

Object Interface

Figure 2:
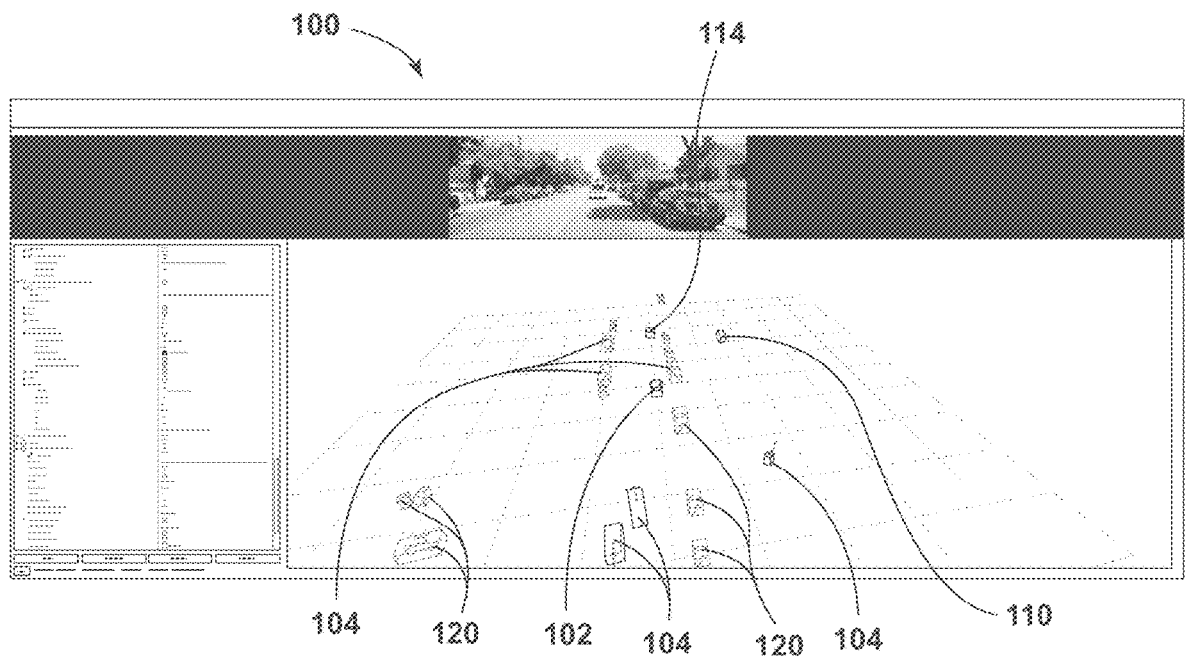
FIG. 2 illustrates an object interface for objects disposed about a vehicle according to one embodiment.
Figure 3:
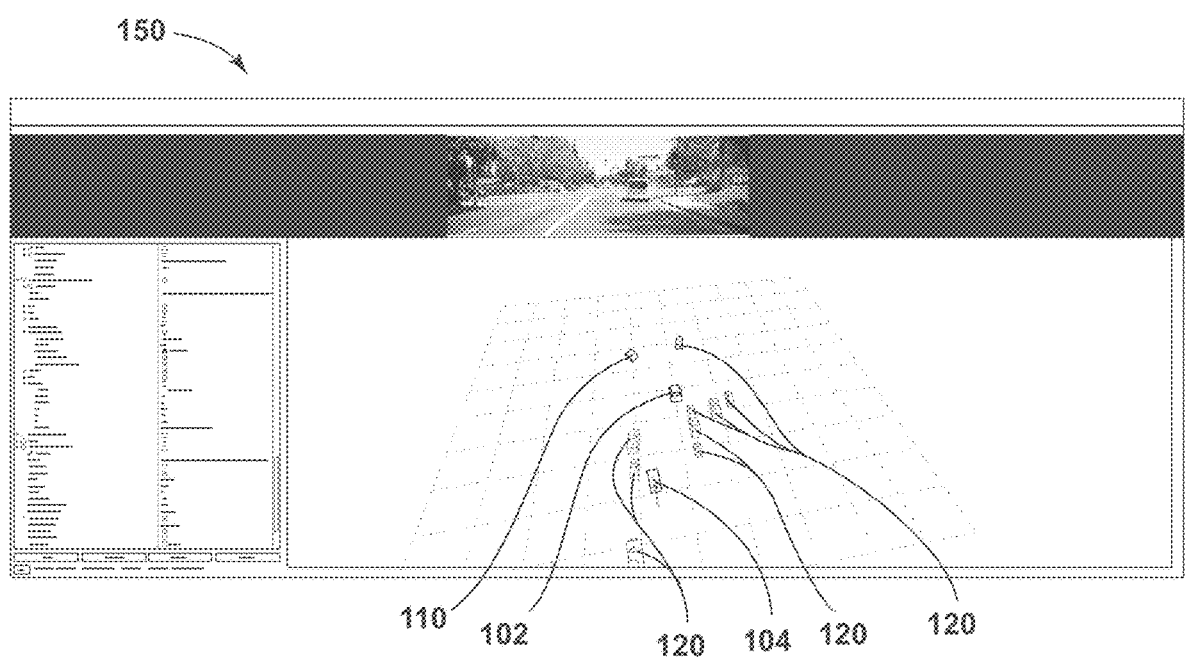
FIG. 3 illustrates an object interface for objects disposed about a vehicle according to FIG. 2 at a different time.

FIGS. 2 and 3 show results of an implementation with three sensor modalities (video imaging sensors 50, radar sensors 54, Lidar sensors 60). The subject vehicle is labeled as subject object 102. Objects having high redundancy that are sensed as moving are labeled 104 (p_ex,min, p_ex,max, p_ex,med all close to 1), objects having low redundancy are labeled as phantom objects 110 (only p_ex,max close to 1), and objects measured only by two out of three sensors are labeled as objects 114 (p_ex,min close to 0, p_ex,med and p_ex,max close to 1). Static objects are labeled as static objects 120. The objects of the object interface 100 each correspond to a different vector. Thus, the vectors correspond to an object interface, wherein each of the vectors includes all existence probabilities of all contributing ones of the plurality of sensors for the corresponding object. Of course, for one sensor, different existence probabilities can correspond to different objects depending on their distance away from the sensor or their location in field of view from the sensor 50, 54, 60. Thus different sensors are disregarded in determining existence probabilities for a vector corresponding to an object.

FIG. 2 shows a phantom object 110 at the front on the right, relative to the subject object 102. The vehicle ahead as phantom object 110 is not identified by one of the sensors 50 54, 60.

All real objects are identified with full redundancy. A plurality of objects each correspond to a separate vector determined by the electronic tracking unit 30 that are displayed. However, FIG. 3 shows that there is a phantom object 110 in front of the subject object 102 on the left, which is generated by an error in one of the sensors 50, 54, 60, but is not confirmed by the other sensor modalities.

The embodiment is directly visible and thus demonstrable on the object interface 100, 150 whenever the latter is visible toward the outside. The object interface 100, 150 is visible toward the outside when: a) delivered to a third party or third parties for development of an electronic planning unit or another purpose (original equipment manufacturer (OEM) accesses object interface 100 of a supplier); b) sent between different electronic control units in the vehicle such as the electronic tracking unit 30 and the electronic planning unit 70; c) recorded as a relevant interface in a data event recorder 96; or d) transmission to a teleoperation location via a transceiver 68. In another embodiment, the object interface is provided from the electronic tracking unit 30 to at least one from a group consisting of: an electronic planning unit 70 in the vehicle; a data event recorder 96; and wirelessly transmitted to a remote teleoperation location by the transceiver 68.

In one embodiment, control of the vehicle represents at least one selected from a group consisting of: accelerating the vehicle, decelerating the vehicle, and steering the vehicle.

Various features, advantages, and embodiments are set forth in the following claims.

What is claimed is:

1. A system for determining reliability of objects that are sensed for use in driver assistance or automated driving of a vehicle, the system comprising:
a plurality of sensors for providing sensor data for the objects that are sensed, the plurality of sensors including one or more sensor modalities;
an electronic tracking unit for receiving the sensor data, the electronic tracking unit configured to process the sensor data to:
determine a detection probability (p_D) for each of the plurality of sensors for each of the objects,
determine an existence probability (p_ex) for each of the plurality of sensors for each of the objects,
provide a collection of existence probabilities defining vectors for each of the objects sensed based on the existence probability (p_ex) for each of the plurality of sensors for each of the objects, wherein the vectors include all existence probabilities of all contributing ones of the plurality of sensors for each of the objects, and wherein the vectors are sensor independent representations; and an electronic planning unit, wherein the planning unit is configured to receive the vectors and control the vehicle.

2. The system according to claim 1, wherein the vectors are provided by the electronic tracking unit to display as an object interface on a display device.

3. The system according to claim 1, wherein the plurality of sensors include Lidar sensors, radar sensors, and video imaging sensors.

4. The system according to claim 3, wherein the electronic tracking unit is configured to determine the existence probability for each sensor modality to provide the existence probability (p_ex,L) for the Lidar sensors, the existence probability (p_ex,R) for the radar sensors, and the existence probability (p_ex,V) for the video imaging sensors for each of the objects sensed.

5. The system according to claim 4, wherein the existence probability (p_ex,L), the existence probability (p_ex,R), and the existence probability (p_ex,V) each have a value from between 0 and 1, wherein the value of 0 means the object is not detected.

6. The system according to claim 1, wherein the electronic tracking unit is configured to sense a presence of a traffic light, and a color of the traffic light,
wherein the plurality of sensors include four video imaging sensors,
wherein the four video imaging sensors have detection probability values p_D for sensing the traffic light and the electronic tracking unit is configured to provide the existence probability values p_ex to a planning unit for control of the vehicle, and
wherein the vehicle is an autonomous vehicle.

7. The system according to claim 1, wherein the electronic tracking unit is configured to provide vectors for each of the objects based on the existence probability (p_ex) for all contributing ones of the plurality of sensors for each of the objects, wherein the vectors are provided by the electronic tracking unit for display as an object interface on a display device.

8. The system according to claim 7, wherein the object interface is provided to third parties for development of a standalone electronic planning unit.

9. The system according to claim 7, wherein the object interface is provided from the electronic tracking unit to at least one from a group consisting of: an electronic planning unit in the vehicle; a data event recorder; and a transmission to a remote teleoperation location.

10. A system for determining reliability of objects sensed for a driver assistance arrangement or an autonomous vehicle, the system comprising:
a plurality of sensors for providing sensor data for objects, the plurality of sensors including one or more sensor modalities;
an electronic tracking unit for receiving the sensor data, the electronic tracking unit configured to process the sensor data to:
determine a detection probability (p_D) for each of the plurality of sensors for each of the objects,
determine an existence probability (p_ex) for each of the plurality of sensors for each of the objects,
provide vectors for each of the objects based on the existence probability (p_ex) for all contributing ones of the plurality of sensors for each of the objects,
and
a display device for displaying the vectors as an object interface.

11. The system according to claim 10, wherein the object interface is provided to third parties for development of an electronic planning unit.

12. The system according to claim 10, wherein the existence probability (p_ex) includes an existence probability maximum, (p_ex,max), an existence probability minimum (p_ex,min), and an existence probability median (p_ex, med), which are provided as redundancy information for the object interface.

13. The system according to claim 12, wherein the plurality of sensors include Lidar sensors, radar sensors, and video imaging sensors, each having different sensor modalities.

14. A system for driver assistance or automated driving of a vehicle by determining a reliability of objects that are sensed, the system comprising:
a plurality of sensors for providing sensor data for the objects, the plurality of sensors including one or more sensor modalities; and
an electronic tracking unit for receiving the sensor data, the electronic tracking unit configured to process the sensor data to:
determine a detection probability (p_D) for each of the plurality of sensors for each of the objects,
determine an existence probability maximum (p_ex, max), for each of the plurality of sensors for each of the objects,
determine an existence probability minimum (p_ex, min), for each of the plurality of sensors for each of the objects, and
determine an existence probability median (p_ex, med), for each of the plurality of sensors for each of the objects; and
an electronic planning unit, wherein the planning unit is configured to receive the vectors and control the vehicle.

15. The system according to claim 14, wherein the electronic tracking unit is configured to provide vectors for each of the objects based on the existence probability maximum (p_ex, max), the existence probability minimum (p_ex, min), and the existence probability median (p_ex, med) for each of the plurality of sensors for each of the objects, the vectors corresponding to the object interface, wherein each of the vectors includes all existence probabilities of all contributing ones of the plurality of sensors for the corresponding object.

16. The system according to claim 15, including providing the object interface to at least one from a group consisting of: a data event recorder; and a remote teleoperation location via wireless transmission.

17. The system according to claim 14, including a display device for displaying an object interface.

18. The system according to claim 14, wherein the electronic planning unit in a vehicle is configured to assess redundancy/reliability of each of the objects.

* * * * *